No. 820,346. PATENTED MAY 8, 1906.
C. D. BUNNELL.
AMUSEMENT APPARATUS.
APPLICATION FILED FEB. 6, 1906.
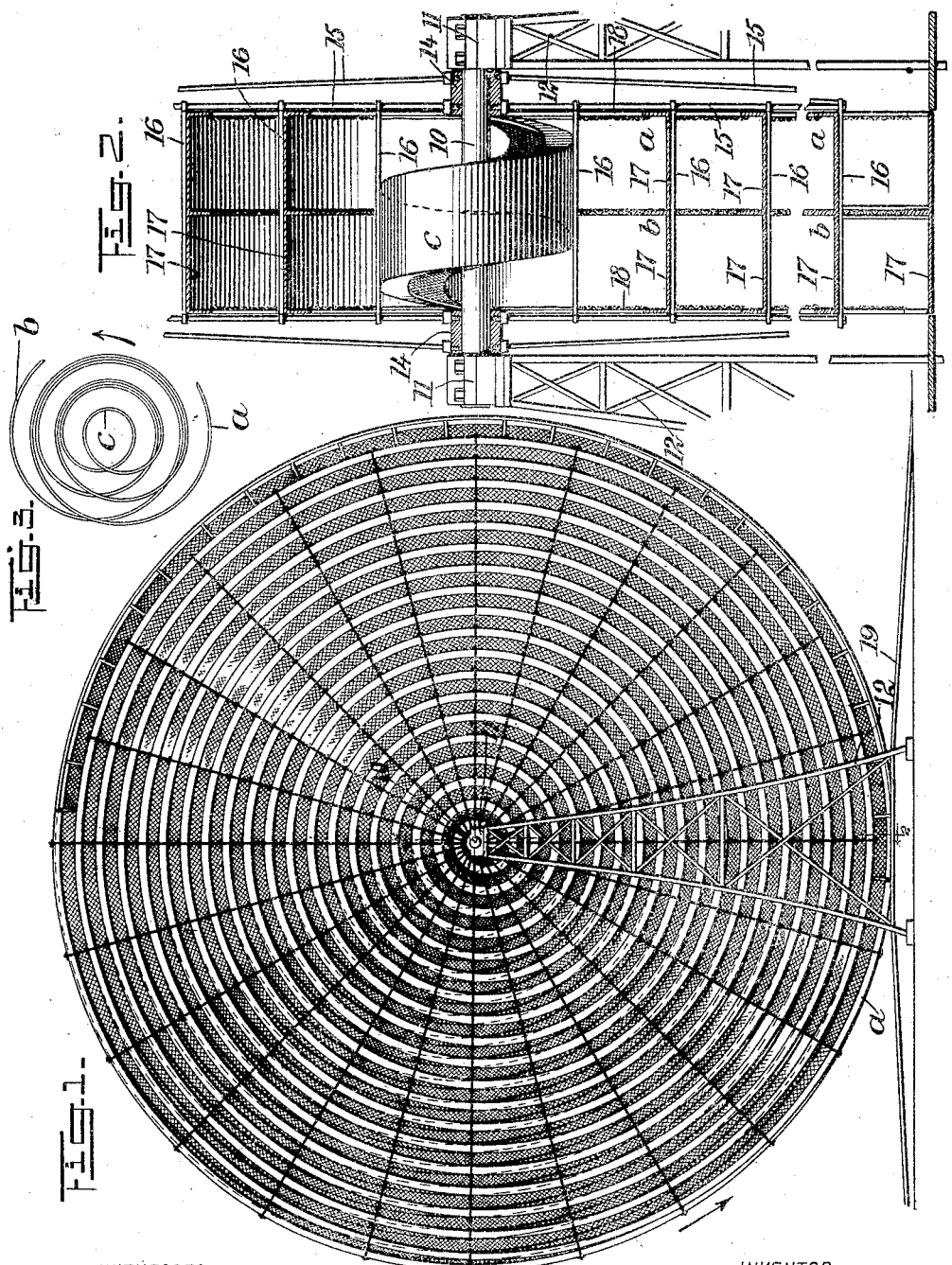
WITNESSES:
INVENTOR
Charles D. Bunnell
BY
ATTORNEYS

UNITED STATES PATENT OFFICE.

CHARLES D. BUNNELL, OF NEW YORK, N. Y.

AMUSEMENT APPARATUS.

No. 820,346.　　　　Specification of Letters Patent.　　　　Patented May 8, 1906.

Application filed February 6, 1906. Serial No. 299,724.

*To all whom it may concern:*

Be it known that I, CHARLES D. BUNNELL, a citizen of the United States, and a resident of the city of New York, borough of Brooklyn, in the county of Kings and State of New York, have invented a new and Improved Amusement Apparatus, of which the following is a full, clear, and exact description.

The invention relates to an amusement apparatus or device of that general class in which a wheel is arranged to rotate on a horizontal axis and provided with means by which passengers may mount the wheel.

The object of the invention is to provide a wheel with certain peculiarly-arranged elements, causing a car or other vehicle to be raised by the rotation of the wheel from the bottom periphery thereof upward to its center and thence by means of a switch to have its movement reversed and gradually lowered from its center back to the lower periphery of the wheel, which operation is carried on solely by the rotation of the wheel and the coaction of said pecular elements with the car or other vehicle referred to.

Various other objects of major or minor importance are involved, and all will be fully set forth hereinafter and particularly pointed out in the claims.

Reference is to be had to the accompanying drawings, which illustrate as an example the preferred embodiment of my invention, in which—

Figure 1 is a front elevation of the invention. Fig. 2 is an enlarged fragmentary section on the line 2 2 of Fig. 1, and Fig. 3 is a diagram showing the arrangement of the tracks.

The axle 10 of the wheel is mounted on suitable boxes 11, supported by towers 12, of which there are preferably two in number, arranged one at the front and one at the rear of the apparatus, and of any suitable construction. The detail construction of the wheel is also not essential to my invention. It is sufficient that the wheel be constructed of proper length and mounted on the axle 10, so that it may rotate between the supporting-towers 12. As here shown, the wheel comprises hubs 14, fastened to the shaft and attached to radial braces or spokes 15, which are connected by cross tie-rods 16, producing a rigid structure and supporting the floors 17 of the spiral tracks with which the wheel is provided. These spiral tracks are two in number, as shown best in Figs. 2 and 3, and are indicated in Fig. 3 by letters *a* and *b*, respectively. Said tracks lead from the center of the wheel to the periphery and are disposed oppositely, so that an object placed on the track *a* will, for example, upon rotation of the wheel in the direction indicated by the arrow in said view be elevated to the center of the wheel and entering the switch *c* will be crossed over to the track *b*, and then upon the continued rotation of the wheel in the direction indicated said carriage or vehicle will be returned along the track *b* to the bottom periphery of the wheel. Said tracks *a* and *b* and switch *c* are illustrated clearly in Fig. 2. The switch *c* furnishes a means for transferring the vehicle from the inner end of the track *a* to the corresponding end of the track *b*. The tracks *a* and *b* are provided at their sides with guard rails or walls 18, (shown best in Fig. 2,) which separate the tracks from each other and prevent the vehicle from running off the track.

In the use of the invention the vehicle, mounted as shown, should be provided with an inclined approach—such, for example, as that indicated at 19 in Fig. 1—so that vehicles, either cars especially provided or motor-vehicles or the other vehicles of visitors, may be run onto the track *a* at the outer end thereof. The wheel, as shown in Fig. 1, is in position for the entry of a vehicle onto the outer end of the track *a* thereof. When this is done, as the wheel rotates in the direction indicated by the arrow in Fig. 1 the vehicle will be steadily elevated toward the center of the wheel and then running into the switch *c* will be guided over to the track *b*, and the descent of the vehicle will begin. The wheel should be given an intermittent motion to allow one or more vehicles to be placed in each convolution of the track, thus accommodating at the same time a large number of vehicles.

The mechanism for driving the wheel is entirely immaterial and may be of any sort desired. It will also be apparent that the wheel may be illuminated and otherwise ornamented at will without in any way departing from the principle of my invention. The invention may also be used for animals, which in climbing on the tracks of the wheel will cause it to revolve, thus creating exercise for the animals and amusement for the spectators.

Having thus described the preferred form of my invention, what I actually claim, and desire to secure by Letters Patent, is—

1. An amusement apparatus comprising a wheel having a spiral track thereon leading from the periphery to the center of the wheel, and means for revolubly mounting the wheel whereby to cause a vehicle to move from one end to the other of the track.

2. An amusement apparatus comprising a wheel having a spiral track thereon leading from the periphery to the center of the wheel, and means for revolubly mounting the wheel whereby to cause a vehicle to move from one end to the other of the track, the said wheel being mounted in a vertical plane to rotate around a horizontal axis whereby to raise or lower the vehicle.

3. An amusement apparatus having a wheel provided with two oppositely-disposed spiral tracks leading from the center to the periphery of the wheel, a switch connecting said tracks at the center of the wheel, and means for mounting the wheel to rotate whereby a vehicle running on one track may be moved by the rotation of the wheel to the center thereof, and switched over to the second track to be returned to the starting-point by the continued rotation of the wheel in the same direction.

4. An amusement apparatus having a wheel provided with two oppositely-disposed spiral tracks leading from the center to the periphery of the wheel, a switch connecting said tracks at the center of the wheel, and means for mounting the wheel to rotate whereby a vehicle running on one track may be moved by the rotation of the wheel to the center thereof, and switched over to the second track to be returned to the starting-point by the continued rotation of the wheel in the same direction, said wheel running in a vertical plane around a horizontal axis.

In testimony whereof I have signed my name to this specification in the presence of two subscribing witnesses.

CHARLES D. BUNNELL.

Witnesses:
    ISAAC B. OWENS,
    JNO. M. RITTER.